United States Patent
Brodsky et al.

(10) Patent No.: US 6,751,597 B1
(45) Date of Patent: Jun. 15, 2004

(54) SYSTEM AND METHOD FOR ADAPTIVE TRADE SPECIFICATION AND MATCH-MAKING OPTIMIZATION

(75) Inventors: Alex Brodsky, Rockville, MD (US); Stanislav Zelivinski, Gaithersburg, MD (US); Marcel Katz, Rockville, MD (US); Alan Gozhansky, Rockville, MD (US); Sonya Karpishpan, Rockville, MD (US)

(73) Assignee: B2E Sourcing Optimization, Inc., Rockville, MD (US)

( * ) Notice: Subject to any disclaimer, the term of this patent is extended or adjusted under 35 U.S.C. 154(b) by 304 days.

(21) Appl. No.: 09/695,046

(22) Filed: Oct. 25, 2000

Related U.S. Application Data

(60) Provisional application No. 60/163,425, filed on Nov. 3, 1999, provisional application No. 60/163,243, filed on Nov. 3, 1999, and provisional application No. 60/161,355, filed on Oct. 26, 1999.

(51) Int. Cl.[7] ............................................. G06F 17/60

(52) U.S. Cl. .......................................... 705/37; 705/35

(58) Field of Search ............................... 705/26, 27, 37, 705/35; G06F 17/60

(56) References Cited

U.S. PATENT DOCUMENTS

| | | | | |
|---|---|---|---|---|
| 5,297,031 A | * | 3/1994 | Gutterman et al. | 705/37 |
| 5,689,652 A | * | 11/1997 | Lupien et al. | 705/37 |
| 5,727,165 A | * | 3/1998 | Ordish et al. | 705/37 |
| 5,774,873 A | | 6/1998 | Berent et al. | 705/26 |
| 5,940,807 A | * | 8/1999 | Purcell | 705/26 |
| 5,950,177 A | * | 9/1999 | Lupien et al. | 705/37 |
| 5,963,923 A | * | 10/1999 | Garber | 705/37 |
| 6,006,201 A | | 12/1999 | Berent et al. | 705/27 |
| 6,016,483 A | * | 1/2000 | Rickard et al. | 705/37 |
| 6,035,287 A | | 3/2000 | Stallaert et al. | |
| 6,098,051 A | * | 8/2000 | Lupien et al. | 705/37 |

(List continued on next page.)

FOREIGN PATENT DOCUMENTS

| | | | | |
|---|---|---|---|---|
| EP | 0434224 A2 | * | 6/1991 | G06F/15/21 |
| EP | 1226516 A2 | * | 7/2002 | G06F/17/00 |
| EP | 1228467 A | * | 8/2002 | G06F/17/60 |
| EP | 1350206 A1 | * | 10/2003 | G06F/17/60 |
| JP | 05314139 A | * | 11/1993 | G06F/15/21 |
| JP | 2000172761 A | * | 6/2000 | G06F/17/60 |
| JP | 2002358434 A | * | 12/2002 | G06F/17/60 |

OTHER PUBLICATIONS

See the continuation sheet.*
Mirlas et al., Business policy representation generation system for collaborative business activities, creates links between compilation of business rules . . . , Derwent–Acc–No.: 2002–558403, Aug. 01, 2002.*
Moutchkine et al., E–commerce system for supervising transactions among multiple transactions initiators and multiple transactio procedure . . . , Derwent–Acc–No.: 2001–522637, Aug. 23,2001.*

*Primary Examiner*—Cuong Nguyen
(74) *Attorney, Agent, or Firm*—Blank Rome LLP

(57) ABSTRACT

Electronic commerce is facilitated through adaptive trade specifications and matchmaking optimization. Adaptive trade specifications provide a standard format for traders to specify what they want to obtain and what they are willing to give for it, in both qualitative and quantitative terms, as well as constraints and an objective such as maximum profit or minimum price. The standard format of the adaptive trade specifications allows the matchmaking optimization process to find the optimal match between traders. For example, if a buyer wishes to minimize the price of a desired purchase, subject to certain constraints, the standard format allows location of sellers meeting the constraints and performs one of various types of optimization to match the buyer with one or more sellers. Thus, one or more mutually agreeable transactions can be recommended.

8 Claims, 8 Drawing Sheets

U.S. PATENT DOCUMENTS

| | | | | |
|---|---|---|---|---|
| 6,112,181 A | * | 8/2000 | Shear et al. | 705/37 |
| 6,112,189 A | * | 8/2000 | Rickard et al. | 705/37 |
| 6,131,087 A | * | 10/2000 | Luke et al. | |
| 6,134,535 A | * | 10/2000 | Belzberg | 705/37 |
| 6,141,653 A | * | 10/2000 | Conklin et al. | 705/37 |
| 6,304,858 B1 | * | 10/2001 | Mosler et al. | 705/37 |
| 6,321,212 B1 | * | 11/2001 | Lange | 705/37 |
| 6,343,278 B1 | * | 1/2002 | Jain et al. | 705/37 |
| 6,601,044 B1 | * | 7/2003 | Wallman | 705/36 |
| 6,618,707 B1 | * | 9/2003 | Gary | 705/37 |
| 2001/0014875 A1 | | 8/2001 | Young et al. | 705/37 |

* cited by examiner

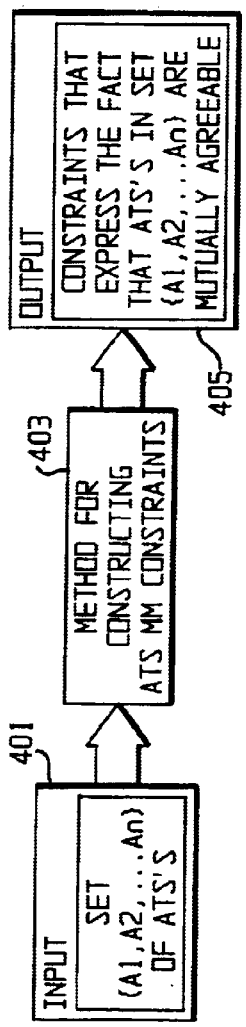
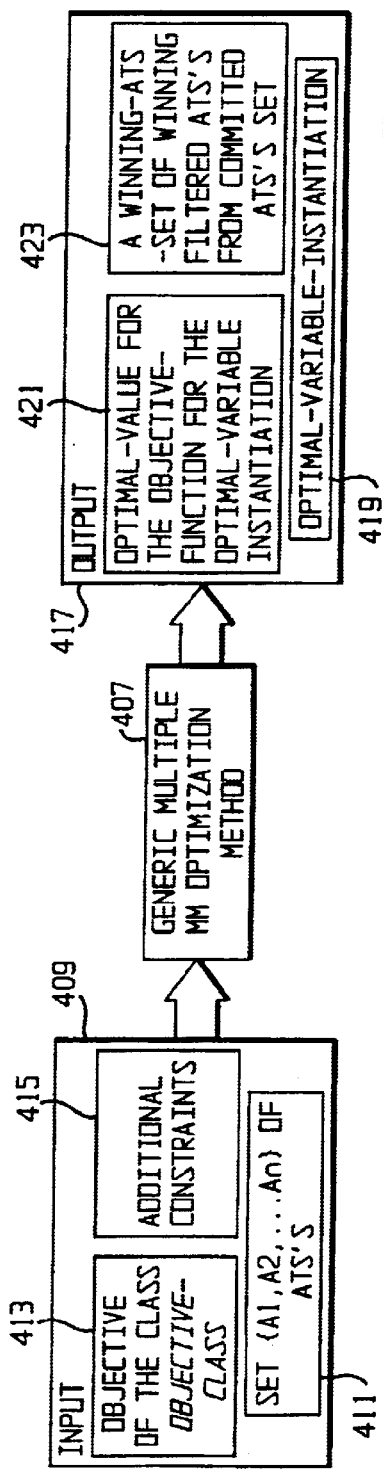
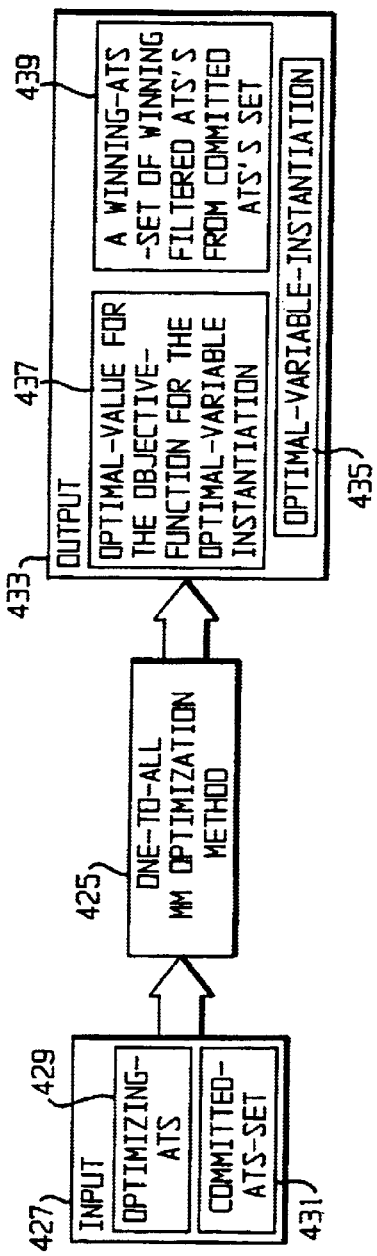

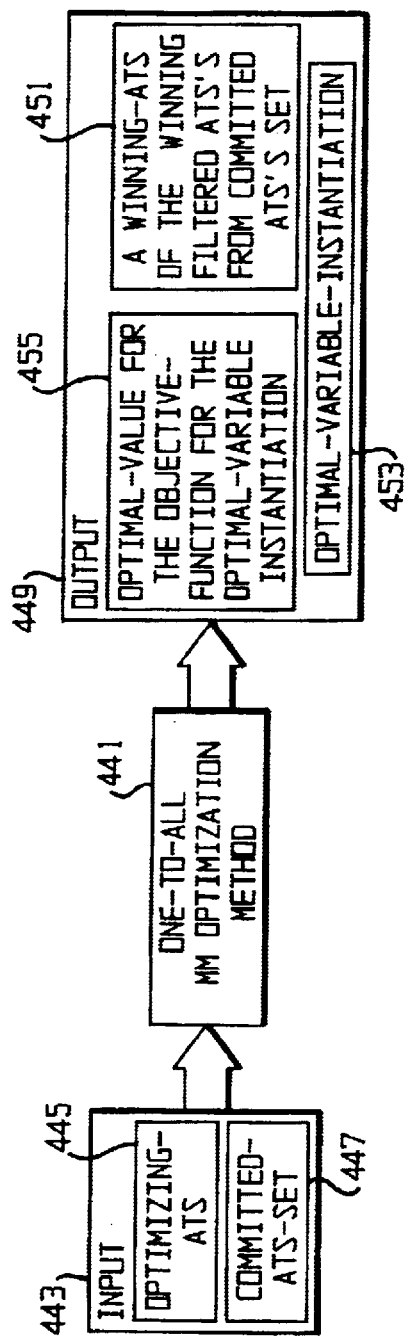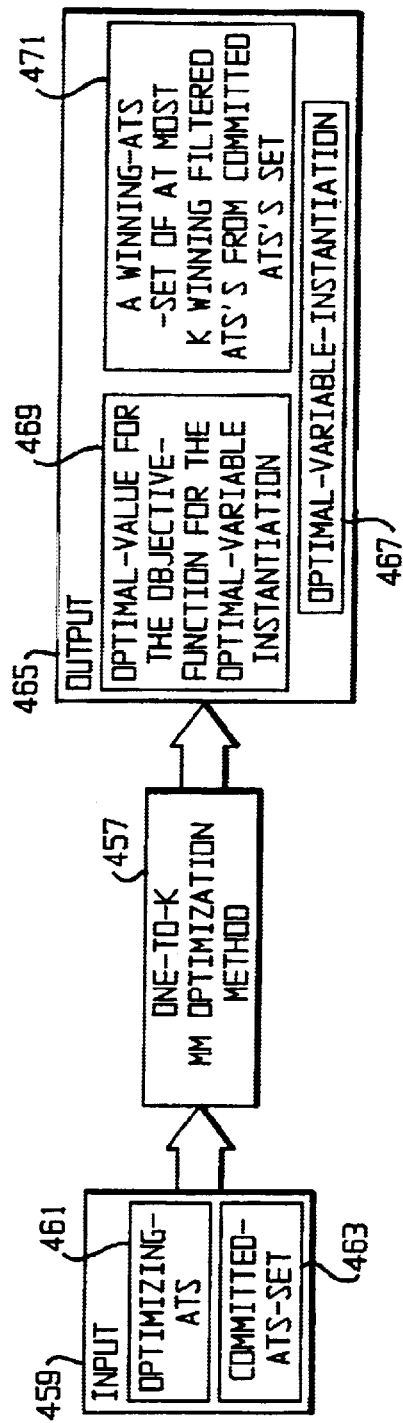

SYSTEM AND METHOD FOR ADAPTIVE TRADE SPECIFICATION AND MATCH-MAKING OPTIMIZATION

CROSS-REFERENCE TO RELATED APPLICATIONS

The present application claims the benefit of U.S. Provisional Application No. 60/161,355, filed Oct. 26, 1999. Related subject matter is set forth in U.S. Provisional Application Nos. 60/163,425 and 60/163,243, both filed Nov. 3, 1999. The disclosures of all of the just-cited provisional applications are hereby incorporated by reference in their entireties into the present disclosure.

BACKGROUND

1. Field of Invention

The present invention relates to a system and method for conducting trade activities and more particularly to a system and method for conducting trade activities electronically with the capability of achieving and optimizing complex trade objectives in the realm of electronic commerce.

2. Discussion of Prior Art

Current electronic commerce systems lack the decision support capabilities necessary for achieving the objectives of the various traders, especially in business-to-business electronic transactions. For example:

Procurement Organization. A business or government agency may seek to perform a multi-million dollar procurement of various office supplies from a possibly large number of authorized suppliers. An example of a procurement objective is to minimize the total expenditure on the required quantities of office supplies, under the limitations of the allocated budget, and the maximal price per specific items the agency is ready to pay. It is desirable that the underlying E-commerce system would recommend the optimal trade, i.e., what items and in what quantities should be purchased from each authorized supplier and for what price. Buying each item from a supplier offering the minimal price per item may not be the best strategy, because of various deals, incentives and volume discounts that suppliers may be willing to offer.

Supplier. A computer hardware supplier offers a range of components and their configurations. One possible objective is maximizing its revenue, while maintaining at least a 17% profit margin, subject to limitations on the current inventory levels and capacity, and under the requirement that inventory turnover be at least 50% per month. Also, a supplier may be willing to offer numerous special deals and incentives to preferred volume buyers.

Manufacturer. A pharmaceutical manufacturer may seek to perform a complex transaction of selling a bundle of its products to a chain of drug stores, and, at the same time, purchasing a range of raw materials necessary to manufacture them. In doing so, the manufacturer may be trying to achieve the objective of maximizing the overall profit subject to the limitations on manufacturing production capacity, available manufacturing processes and the available cash.

Collaborating Bidder. An authorized (e.g., on a GSA schedule) supplier (or manufacturer) is willing to put a bid in response to a big procurement solicitation by the federal government. The supplier may be too small to respond to large-scale solicitation, and he may seek to find a bidding alliance with other complementary suppliers. An example objective of the supplier may be to minimize the combined bid price (to increase the chances of winning), while guaranteeing his own 13% profit margin and under the restriction that his expenses shall not exceed $2 million.

Surplus Seller. An electronic device manufacturer may seek to eliminate useless surplus inventory. The objective here may be to maximize the sale price for the overall surplus, possibly selling it to more than one buyer.

For decision support, corporations with large volume of business transactions maintain extensive operations and R&D staff, as well as special-purpose, often proprietary, decision-support systems. However, the development of such special-purpose systems requires tremendous R&D effort in terms of time and capital outlay. Furthermore, those special purpose systems are typically not adaptable when it comes to dynamic evolutionary changes in business structure, constraints and objectives. Moreover, even in large corporations, many of the decision support activities, such as in the above examples, are not automated. Most importantly, special purpose systems are not capable of supporting transactions that span across widely distributed suppliers, manufacturers, and procurement organizations. On the other side of the spectrum, many small and medium size companies and organizations simply cannot afford the luxury of maintaining large sales and procurement staff and the special-purpose decision support tools. Those companies cannot keep up with ever-changing business opportunities, which often involve numerous business parties engaged in electronic commerce.

Companies such as Ariba, CommerceOne, Commerce Exchange, etc., do provide procurement and supply side integration, but the decision of exactly which items need to be purchased or sold, from or to which trader, and in what quantities and for what prices is left to sales and procurement personnel. Also lacking matchmaking optimization capabilities are Internet-based electronic commerce services, such as electronic malls and shops (e.g., IMALL and Amazon.com), electronic auctions (e.g., EBAY and Yahoo), and competitive shopping (e.g., PriceLine.com, using a reverse auction). Today, companies in that category mainly provide business-to-consumer and consumer-to-consumer services, but are also trying to expand into the business-to-business market. Products like IBM Net.Commerce and MS Site Server are suites of software productivity tools used to deploy a wide range of E-commerce solutions. However, they also lack the decision support capabilities necessary for achieving complex trade objectives.

Current Internet-based trade systems only support simple trade objectives such as purchasing or selling specific items within a certain price range. For example, EBAY allows the auctioning of specific items, i.e., iterative price-bids bounded by a floor price and a time deadline. IMALL supports selling specific products or services at a fixed price. PriceLine.com allows customers to bid their own price for a product or service, does comparative shopping and keeps the monetary difference.

Prior art examples of systems and methods used in connection with electronic commerce, trade optimization and logistics support are disclosed in various US Patents and related literature.

U.S. Pat. No. 4,903,201 discloses a computerized automated futures trading exchange. The traders in the exchange enter bids to purchase commodity contracts. They also enter offers to sell commodity contracts The system automatically matches between bids and offers. The system automatically completes transactions between traders.

The invention above lacks the capability to match an aggregation of partial bids to an aggregation of partial offers, where bids and offers are specified as ranges delimited by constraints. In the invention above the trader lacks the capability to define an objective function and to perform optimization on the specified objective function. The invention above is limited to the futures markets.

U.S. Pat. No. 5,077,665 discloses a matching system in which bids are automatically matched against offers for given trading instruments. Although the system provides match making between bids and offers of financial instruments, the system does not provide the trader the ability to specify objective function, to set constraints per specific financial instrument, and therefore to achieve a predefined business objective. The invention described therein is related only to financial markets and does not allow the user to specify other items for match making besides financial instruments.

U.S. Pat. No. 5,283,731 discloses computer-based classified advertising. The system comprises a data processor and means for creating an advertising database available to each user in the system. The invention described therein restricts the matching capabilities to a single match and does not provide capabilities to perform optimization and to specify complex trading specifications, constraints and objectives.

U.S. Pat. No. 5,710,887 discloses a computer system and method for electronic commerce. The system facilitates commercial transactions between a plurality of customers and at least one supplier of items over a computer driven network capable of providing communications between the supplier and at least one customer site associated with each customer. Despite the fact that the system disclosed in the invention is suitable for a wide range of providers of goods and services, it does not posses the ability to specify particular items in a precise way, or to perform optimized match making. The invention described therein describes various business paradigms for electronic commerce, but does not allow performing "One-to-one" or "One-To-Many" electronic transactions based on optimized match making. In addition, the invention described therein does not allow specification of constraints on specific item parameters.

Another area within the prior art describes various optimization methods and systems, using mostly linear optimization methods. These inventions, although providing optimization tools for business transactions, do not allow users to specify parameters of traded items in a flexible way, do not allow specifications of constraints on specific parameters of a traded item, and do not allow users to perform One-to-One, and One-to-Many transactions.

U.S. Pat. No. 5,630,070 discloses the method for optimization of resources planning. The method described in the invention provides for an optimization of a manufacturing process by designating the amounts of various manufactured products to be produced. In order to accomplish optimization, the method employs an objective function such as maximization of income in a situation where there are limitations on the inventory of raw materials and on the tools employed in the manufacturing process. The method does not allow specifying unique constraints on specific items participating in the manufacturing process. The method does not allow performing multiple transactions and does not allow performing match making of consumers' items with suppliers' items.

All previous inventions describing various methods for manufacturing logistic decision support receive as input a bill of materials or a predefined set of the goods or subassemblies. They do not offer the flexibility of choosing different vendors of subassemblies through a sophisticated match making mechanism.

U.S. Pat. No. 5,450,317 discloses a method and system for optimized logistics planning. The invention described therein recommends optimal order quantities and timing, choice of vendor locations and storage locations, and transportation models, for individual items and for product families. The invention does not allow using a match making mechanism to select vendors. The invention allows for specification of fixed parameters for customers and suppliers, rather than parameters expressed through constraints.

SUMMARY OF THE INVENTION

Summarizing the examples of the inventions described above, it is clear that none of them provides a unified way to perform optimized match making trading activities in the realm of electronic commerce. It is, therefore, an object of the invention to provide an Adaptive Trade Specification (ATS) model for using in electronic commerce realm.

It is further object of invention to provide an ATS based match making and optimization automated method that can find optimal trade transaction for variety of users in electronic commerce domain.

It is an advantage of the invention in comparison with prior art that match making and optimization are combined under one ATS based mechanism which allows traders to design transactions that are optimal in terms of trader's objectives and which are mutually agreeable with available trade specifications The invention allows various traders to achieve optimal trade transactions. First, it provides the Adaptive Trade Specification (ATS) model. The ATS model allows to describe, in a precise and uniform way, trade parameters, constraints and objectives for a wide range of of traders, including procurement organizations, suppliers, manufacturers, resellers, surplus sellers, trade-in sellers, stock marker traders, general buyers and sellers, etc. Second, given a trader's ATS, the invention provides an automated process that recommends specific transactions with other traders' ATS's, that are mutually agreeable with, and optimize the to objective of, the trader's ATS (e.g. minimal price, maximal profit, etc.). More specifically, the invention comprises the following components:

Adaptive Trade Specification (ATS) Model. Adaptive Trade Specification (ATS) is a formal mathematical description of trader's objective and constraints, such as in the examples in the prior art section. ATS constraints include restrictions (on quantities, prices, totals, profits, revenues etc.) that must be satisfied to perform an optimal transaction, and the interconnection between various business parameters (such as profit, quantities, prices and costs). The core of each ATS is a specification of "items" the trader offers to GIVE as well as "items" to TAKE in return. For example, a procurement organization may offer to GIVE the "item" money and wants to TAKE items of office supply. An office equipment supplier may have an ATS, in which all its catalog appears as GIVE items, and money as the only TAKE item. Whereas, a manufacturer may have an ATS, in which all of its products appear as GIVE items, all raw materials and money (i.e., revenues for its products) as TAKE items. ATS is adaptive in that various numeric parameters such as quantities of items, prices, profit, revenue, totals etc. are not fixed, but could vary, provided that they satisfy the ATS constraints. Item specifications in an ATS are also constraint-based and not fixed. For example, an ATS of a trader may include, as one of the TAKE item specifications, a hard disk that has at least 12 GB capacity and is compatible with a G7305E mother board; no exact model or vendor is necessary. The ATS model provides a uniform and expressive way to capture any conceivable trades that can be formulated in terms of given and taken items. To help traders in the definition of an ATS, a library of specialized wizards (i.e., specialized "smart" interface templates) can be used for various types of traders (e.g., suppliers, procurement organizations, manufacturers etc.), as in the examples in the Prior Art section. For each type of trader, the wizard would automatically construct an ATS from the user given set of trading parameters relevant to a trading scenario. The trader who uses a wizard would not need to understand the mathematical description of an ATS, but rather trading parameters and concepts that are familiar to the trader (e.g. availability, quantity, price, revenue, etc.). However, the description of wizard library is described elsewhere in a complementary patent application cited above, and is not intended as a limitation on the present invention.

ATS-based Match Making (MM) Optimization Methods. Given a trader's ATS, the MM optimization methods recommend specific transactions with other traders (i.e., against their ATS's) that are mutually agreeable and optimize the objective of the trader's ATS (e.g., minimal price, maximal profit etc.). The recommended set of transactions will indicate exactly with whom the transaction should be made, the exact GIVE and TAKE items and their quantities, as well as other relevant parameters (e.g., price and profit). For example, for a procurement ATS (i.e., that originates from a procurement trader), the MM optimization methods recommend a set of suppliers' ATS's and the exact quantities of the items to be purchased from each, so that the procurement ATS objective, say the minimal total cost, is achieved. Or, for a manufacturer's ATS, the MM optimization methods can recommend a set of ATS's of buyers interested in the manufacturer's products, and a set of ATS's of suppliers of raw materials, which are necessary to manufacture the products, so that the manufacturer's objective, say maximal profit, is achieved. The ATS-based match making and optimization are generic and work uniformly regardless of a specific wizard (or trader type) that generated them. Four exemplary MM optimization methods are set forth herein: 1. generic MM optimization with any number of committed ATS's and one optimization objective; 2. One-to-All MM optimization which has one optimizing ATS (i.e., whose objective is used for optimization) and which recommends a (multiple) transaction that may involve some or all of the committed ATS's; 3. One-to-One MM optimization, which has one optimizing ATS and recommends a transaction that may involve exactly one committed ATS; and 4. One-to-K MM optimization, where K is an integer number, which has one optimizing ATS and which recommends a multiple transaction that may involve K or less committed ATS's.

BRIEF DESCRIPTION OF THE DRAWINGS

A preferred embodiment of the present invention will be set forth below with reference to the drawings, in which:

FIGS. 4A–4E Functional Diagram of Match-Making and Optimization Method, present a high level graphical summary of five Mathematical Programming Optimization Methods used by the system.

DETAILED DESCRIPTION OF THE PREFERRED EMBODIMENT

Figure 1:
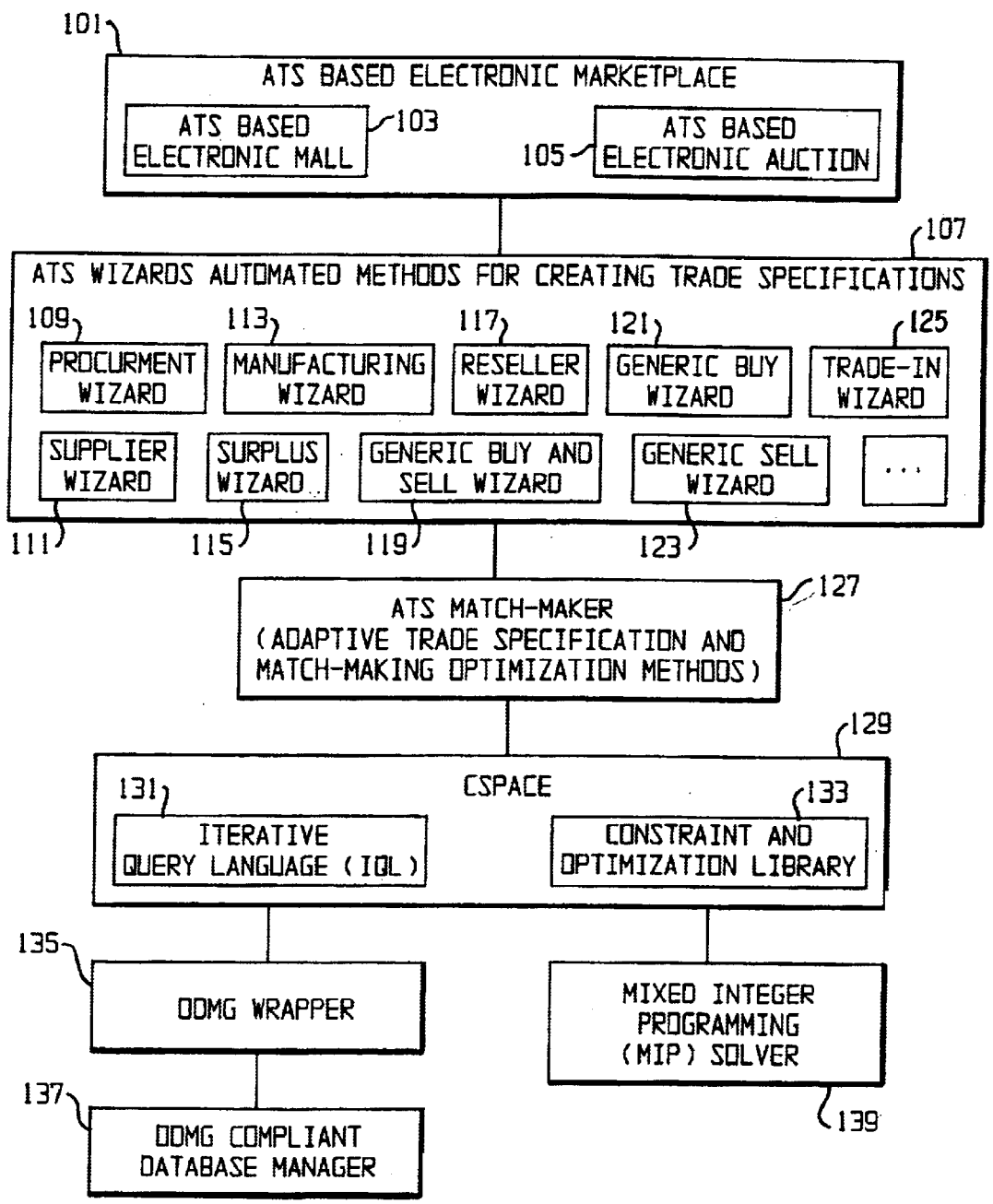
FIG. 1 ATS-Based Trading Software System, describes a high level graphical summary of the suite of software tools related to the ATS-Based Trading Software System.

A preferred embodiment of the present invention will now be set forth in detail with reference to the drawings, in which like reference numerals refer to like elements throughout.

FIG. 1 shows an overview of the operations carried out by the preferred embodiment. An ATS-based electronic marketplace 101 can include one or more of an ATS-based electronic mall 103, an ATS-based electronic auction (forward or reverse) 105, and any other ATS-based commerce environment. As noted above, participants in the marketplace 101 form ATS's through various techniques. One such technique is the use of wizards 107, including one or more of a procurement wizard 109, a supplier wizard 111, a manufacturing wizard 113, a surplus seller wizard 115, a reseller wizard 117, a generic buy and sell wizard 119, a generic buy wizard 121, a generic sell wizard 123, a trade-in wizard 125, and other wizards adapted to specific purposes. These wizards, like those wizards that are known in the programming art, are utilities that guide a user through a specific task.

The ATS's formed through use of the wizards 107 are input to the ATS match-maker 127, which uses matchmaking optimization methods to be described below.

The processes performed by the matchmaker 127 are object-oriented and follow the specifications of the ODMG (Object Database Management Group). A Constraint Object Oriented Database (CSPACE) 129 uses an iterative query language (IQL) 131 and a constraint and optimization library 133 to perform the matchmaking and optimization. The CSPACE 129 communicates through an ODMG wrapper 135 with an ODMG-compliant database manager 137 and also communicates directly with a mixed integer programming (MIP) solver 139.

Figure 2:
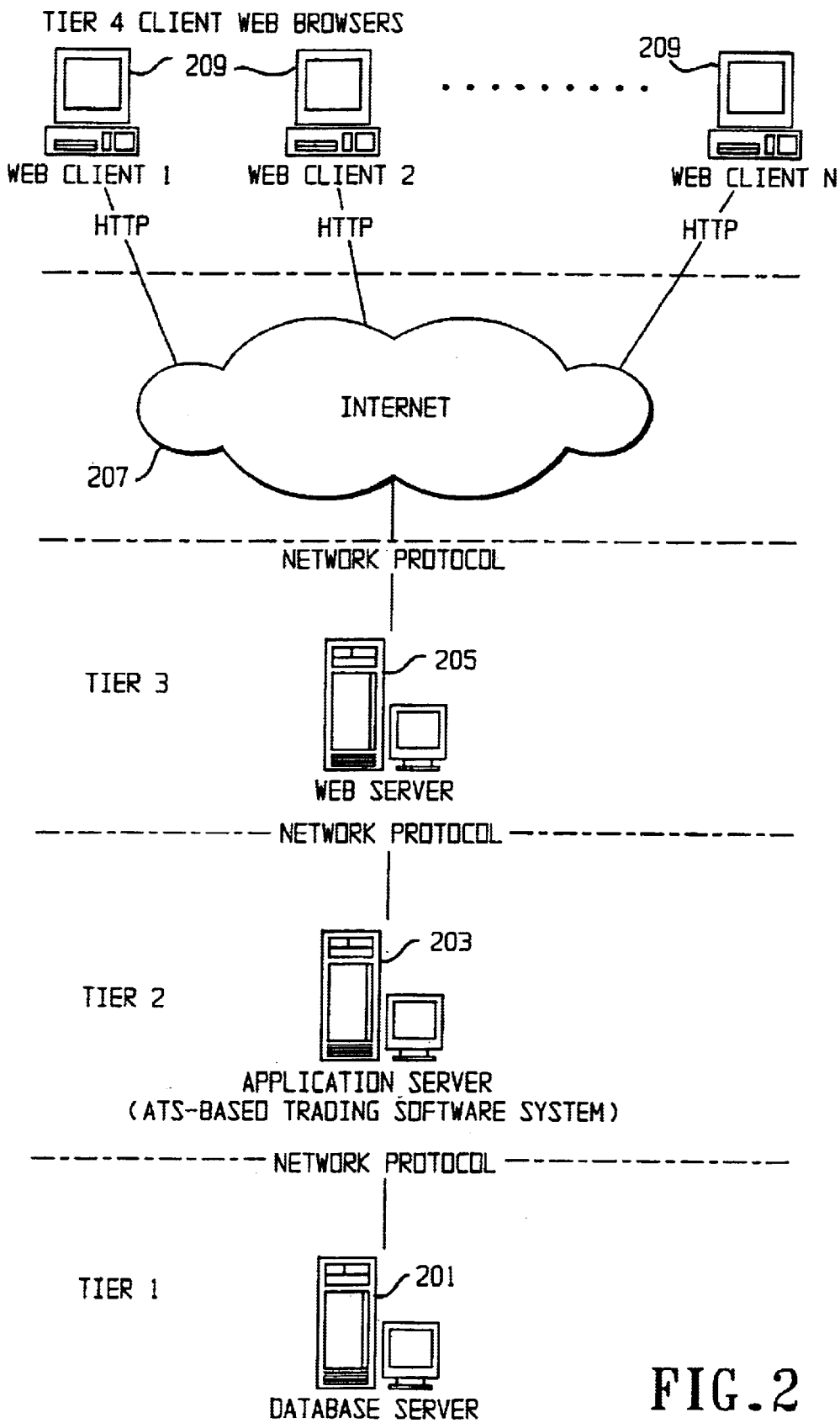
FIG. 2 ATS-Based Match-Making and Optimization Hardware Architecture Diagram, describes a high level graphical summary of the hardware architecture of the system.

The above is implemented on a hardware architecture that will now be explained with reference to FIG. 2. The hardware architecture capable of running an ATS based matchmaking and optimization system includes several logical tiers, each one performing specific computational tasks. Each tier can be described in terms of specific tasks that it performs. From the hardware perspective, each tier can be built from computers having sufficient computational power.

Tier 1 includes a database server 201, which is a power server machine (preferably dual or quad Pentium III machine) running one of the following network operating systems:

Windows NT 4.0, Novell 5.0, UNIX. The database server 201 performs all tasks related to data persistency, data integrity and querying. The database server 201 runs one of the commercially available object oriented databases such as Poet, Objectivity, Object Store, etc.

Tier 2 includes the application server 203, which is a power server machine (preferably dual or quad Pentium III machine) running one of the following network operating systems: Windows NT 4.0, Novell 5.0, UNIX etc. The application server 203 performs all tasks related to performing ATS-based match-making and optimization. The data are passed between layers via RMI, CORBA, DCOM or any other distributed computing protocol allowing remote method invocation and data transmission.

Tier 3 includes a Web server 205, which is a computer that responds to requests from Web browsers via HTTP. The Web server 205 transfers text files and corresponding graphics and data via HTTP to remote computers that are running Web browsers. The Web server 205 should have the functionality commonly associated with e-commerce Web servers, such as CGI (Common Gateway Interface) for performing searches and other dynamic HTML functions and SSL (Secure Socket Layer) for handling secure transactions.

The servers 201, 203, and 205 communicate with another through an internal network. However, in order to be useful to users, the Web server 205 communicates via the Internet 207 or another publicly accessible network with Tier 4, which includes computers 209 running on users' premises and used as Web clients. The Web clients 209 are computers or other devices (such as WAP-enabled wireless devices) capable of running any standard off-the-shelf browser. The clients 209 run Web-based applications that will use information provided by the application server 203 and the Web server 205.

In the description of the model we use object-oriented programming terminology. However, the use of such terminology should be construed as illustrative rather than limiting, as any suitable programming technique can be used to implement the present invention. The ATS model is based on two main classes (i.e., data structures with certain attached methods): Item Specification (IS) and Adaptive Trade Specification (ATS). We first describe item specifications.

Item-Specification (IS) is a class (i.e., a data structure with attached methods). Objects in this class (i.e., specific instances of the class data structure) can represent any "items" relevant in trade, such as material items (e.g., paper, electronic component, chemical), services (e.g., mail delivery, transportation, consulting time), money items (e.g., US dollars, French Francs etc.) or securities (e.g., stocks, bonds, etc.). Generally, an IS object may describe any "tradable item" that can have an associated quantity or amount.

Many different implementations (i.e., in terms of exact attributes and methods) of the IS class are possible. The preferred embodiment provides two implementations. However, many other implementations are also possible, such as item specifications based on ontology hierarchies as well as a variety of emerging XML-based product description standards. The ATS model and the matchmaking optimization methods will work with any given IS class implementation, under the condition that the following binary Boolean function is also provided:

Give-Take-Item-Match(IS1, IS2)

Given two item specification objects IS1 and IS2, Give-Take-Item-Match(IS1,IS2) returns TRUE if and only if the IS1 satisfies the requirements of IS2; and it returns FALSE otherwise. Intuitively, this means that if a trader who requests an item with the specification IS2 is given an item with the specification IS1 instead, she will be satisfied. For example, if the specification IS2 describes "any resistor with resistance between 0.45 to 0.55 ohm" and IS1 describes a "specific resistor of a particular vendor with resistance 0.51 ohm", IS1 will satisfy the requirements of IS2. It is required that every implementation of the Boolean function Give-Take-Item-Match defines the so-called partial ordering, that is, the following three properties must be satisfied:

a) For every item specification object IS, Give-Take-Item-Match(IS,IS) must return TRUE.
b) For every item specification objects IS1 and IS2, if GiveTakeItemMatch(IS1,IS2) and Give-Take-Item-Match(IS2,IS1) both return TRUE, then IS1 and IS2 must be equivalent (i.e., traders would not distinguish them).
c) For every item specification objects IS1, IS2 and IS3, if Give-Take-item-Match(IS1,IS2) and Give-Take-Item-Match(IS2,IS3) both return TRUE, then Give-Take-Item-Match(IS1,IS3) must also return TRUE.

Item Specifications With Numeric and Non-Numeric Properties

This is a possible implementation of the Item-Specification (IS) class. In this implementation, the IS class contains the following attributes:

1. Non-Numeric-Properties, which are composed of:
a. A set S of attribute names, e.g., "vendor", "component-type", "color", "catalog ID" etc.
b. A mapping that associates, with each attribute name in S, its corresponding value.

For example, "supplier" can be mapped to "DGK", "component-type" to "resistor", "color" to "black", and "catalog ID" to "Z123-74-A45".

2. Numeric-Properties, which are composed of:
a. A set of variables' (unknowns') names, e.g., "resistance", "temperature", "voltage", etc.
b. A mapping that associates, with each variable v, a range constraint of the form Lower-bound<=v<=Upper-bound. For example, 0.11<=resistance<=0.12, 32<=temperature<=106, or 210<=voltage<=230.

The Boolean function Give-Take-Item-Match(IS1, IS2) is implemented as follows. It returns TRUE if and only if the following conditions hold:

a. Every (non-numeric) attribute name Attr in IS2 appears also in IS1; and the value associated with Attr in IS1 equals to the value associated with Attr in IS2.
b. Every (numeric) variable name Var in IS2 appears also in IS1; and the range associated with Var in IS1 must contain the range associated with Var in IS2.

For example, suppose IS2 has non-numeric properties component-type="resistor", color="black" and a numeric property 0.09<=resistance<=0.12; and IS1 has non-numeric properties component-type="resistor", color="black", catalog-ID="Z123-74-A45", and numeric properties 0.1<=resistance<=0.11 and 210<=voltage<=230. In this case IS1 satisfies the requirements of IS2, and thus Give-Take-Item-Match(IS1,IS2) must return TRUE. Whereas, if IS1 did not have property "color", then Give-Take-Item-Match(IS1, IS2) would return FALSE, which would also be the case if the non-numeric attribute "color" were mapped to "red", or if the numeric variable "resistance" were mapped to the range constraint 0.1<=resistance<=0.15.

The above implementation of the Give-Take-Item-Match function defines a partial ordering, as required.

Simple Item Specifications

This is the most basic implementation of the Item-Specification (IS) class. In this implementation, the IS class contains a single attribute Item-ID. In this case, the function GiveTakeItemMatch(IS1,IS2) is implemented in such a way that it returns TRUE if and only if IS1 and IS2 are identical. Of course, for this implementation, Give-Take-Item-Match defines a partial ordering, as required.

An ATS is a class (i.e., a data structure with attached methods) that consists of the following attributes:
1. Give-Item-Entries
2. Take-Item-Entries
3. Constraints
4. Objective Give-Item-Entries and Take-Item-Entries.

Give-Item-Entries and Take-Item-Entries describe item specifications (IS) of items a trader is willing to give and take, respectively. Both Give-Item-Entries and Give-Item-Entries are of the same class (type) Item-Entries-Class, which has the following attributes:
1. A set Item-Specs of item specifications (IS).
2. A mapping that associates a quantity-range with each item specification (IS) in the set Item-Specs. A quantity range is a constraint of the form Lower-bound[IS]<=Quantity [IS]<=Upper-bound[IS], which indicates that the quantity (or amount) of items corresponding to the item specification IS (denoted as Quantity[IS]) must be at least Lower-bound[IS] and at most Upper-bound[IS]. Lower-bound[IS] must be a non-negative numeric value, and Upper-bound [IS] must be either a non-negative numeric value or Infinity, meaning that no upper bound is requested. The particular case when Lower-bound[IS]= Upper-bound[IS] indicates that a fixed amount is requested. Also, each quantity range has an indication whether the Quantity[IS] must be a integer (i.e., a whole number, such as 3 or 15) or any real number (e.g., 3.57 or 17.3894). The system must guarantee that object identifiers IS for each item specification is unique, and thus the corresponding variable Quantity[IS] is unique for that item specification.

Constraints

Constraints is an object of type Constraint-Class, which is a class (i.e., a data structure and attached methods) used to describe various mathematical restrictions on numeric parameters (variables) relevant to an ATS. Before giving a precise description of the Constraint-Class, we explain intuitively the notion of (numerical) constraints. As an example, the expression $$50 <= Quantity[IS] <= 150$$

is a (range) constraint of the kind used before. Or, $$\text{Total-Price} = 3.4 * Quantity[IS1] + \ldots + 15.7 * Quantity[ISn]$$

is a constraint that defines the function Total-Price as the sum of all prices of the items IS1 through ISn.

As a more complex example, a reseller may have the following constraint:

$$\text{Total-Price} = \text{Unit-Price}[IS1] * Quantity[IS1] + \ldots + \text{Unit-Price}[ISn] * Quantity[ISn] \text{ AND}$$

$$\text{Total-Cost} = \text{Unit-Cost}[IS1] * Quantity[IS1] + \ldots + \text{Unit-Cost}[ISn] * Quantity[ISn]$$

AND

Profit=Total-Price—Total-Cost AND
Minimal-Profit-Margin=0.25 AND
Availability=3 (business days) AND
Profit>=Minimal-Profit-Margin*Total-Cost AND
 (Profit>=15,000
 OR
 Total-Price>=300,000)

This constraint defines Total-Price and Total-Cost (in terms of individual quantities and unit prices and costs, respectively), Profit, Minimal-Profit-Margin, and Availability. Also, the constraint sets a restriction on Profit (to make at least the Minimal-Profit-Margin), and also requests that either (1) a Profit be at least $15,000 (possibly above the minimal profit margins) or (2) the overall revenue (i.e., Total-Price) be at least $300,000 (and still the minimal profit margin is achieved).

Some of the parameters (variables) in the above constraint, such as Unit-Prices, Profit, Minimal-Profit-Margin, while relevant to a supplier, may not be relevant to potential buyers. Moreover, a supplier may be willing not to disclose information about them, and decide that information to be disclosed to potential buyers could only involve Total-Price, Availability, and the quantities Quantity[IS1], . . . , Quantity[ISn]. This is done by the so-called existential quantification such as in:

There exist values for all variables except (Total-Price, Availability, Quantity[IS1], . . . , Quantity [ISn]) such that:
( $$\text{Total-Price} = \text{Unit-Price}[IS1] * Quantity[IS1] + \ldots + \text{Unit-Price}[ISn] * Quantity[ISn]$$

AND $$\text{Total-Cost} = \text{Unit-Cost}[IS1] * Quantity[IS1] + \ldots + \text{Unit-Cost}[ISn] * Quantity[ISn]$$

AND

Profit=Total-Price−Total-Cost AND
Minimal-Profit-Margin=0.25 AND
Availability=3 (business days) AND
Profit>=Minimal-Profit-Margin*Total-Cost AND
 (Profit>=15,000
 OR
 Total-Price>=300,000
)
)

We now give a precise description of the Constraint-Class. Each object of this class (including Constraints in the ATS class) has the following attributes and methods:
1. A set Vars of variable names (unknowns), such as Quantity[IS], Total-Price, Profit, Item-Price[IS] etc.
2. Indication for each variable name in Var whether it stands for Integer values only, or for arbitrary Real values.
3. A Boolean method Truth-Value. When applied to a Constraint object with argument of the class Variable-Instantiation, it returns a Boolean value TRUE or FALSE. An object of the class Variable-Instantiation stores an integer value for each Integer variable in the constraint, and real value for each Real variable. For example, given a Variable-Instantiation of 3 to x and 4 to y, the Truth-Value of the constraint x+y<=6 is FALSE because it is not correct that 3+4<=6. On the other hand, for the Variable-Instantiation of 2 to x and 3 to y, the Truth-Value of the constraint x+y<=6 is TRUE, because it is correct that 2+3<=6.
4. A Boolean method Satisfiable with no arguments. When applied to a Constraint object, it returns the Boolean value TRUE if and only if there exists a Variable-Instantiation that makes the Constraint object TRUE (i.e., Truth-Value method applied to the Constraint object with the argument Variable-Instantiation would return TRUE.). For example, the constraint x+y<=6 is Satisfiable because there exist a Variable-Instantiation (e.g., 2 to x and 3 to y) that makes the constraint TRUE.

Objective

Objective is an object of the class Objective-Class, which has two attributes:
1. Objective-Function, which is a name of a parameter (variable) to be optimized (e.g., Profit, Total-Cost)
2. Indication whether Minimum or Maximum of the objective function is desired (by the trader).

Note the definition of the objective function (e.g., Profit= Total-Price−Total-Cost etc.) is given in Constraints.

Figure 3:
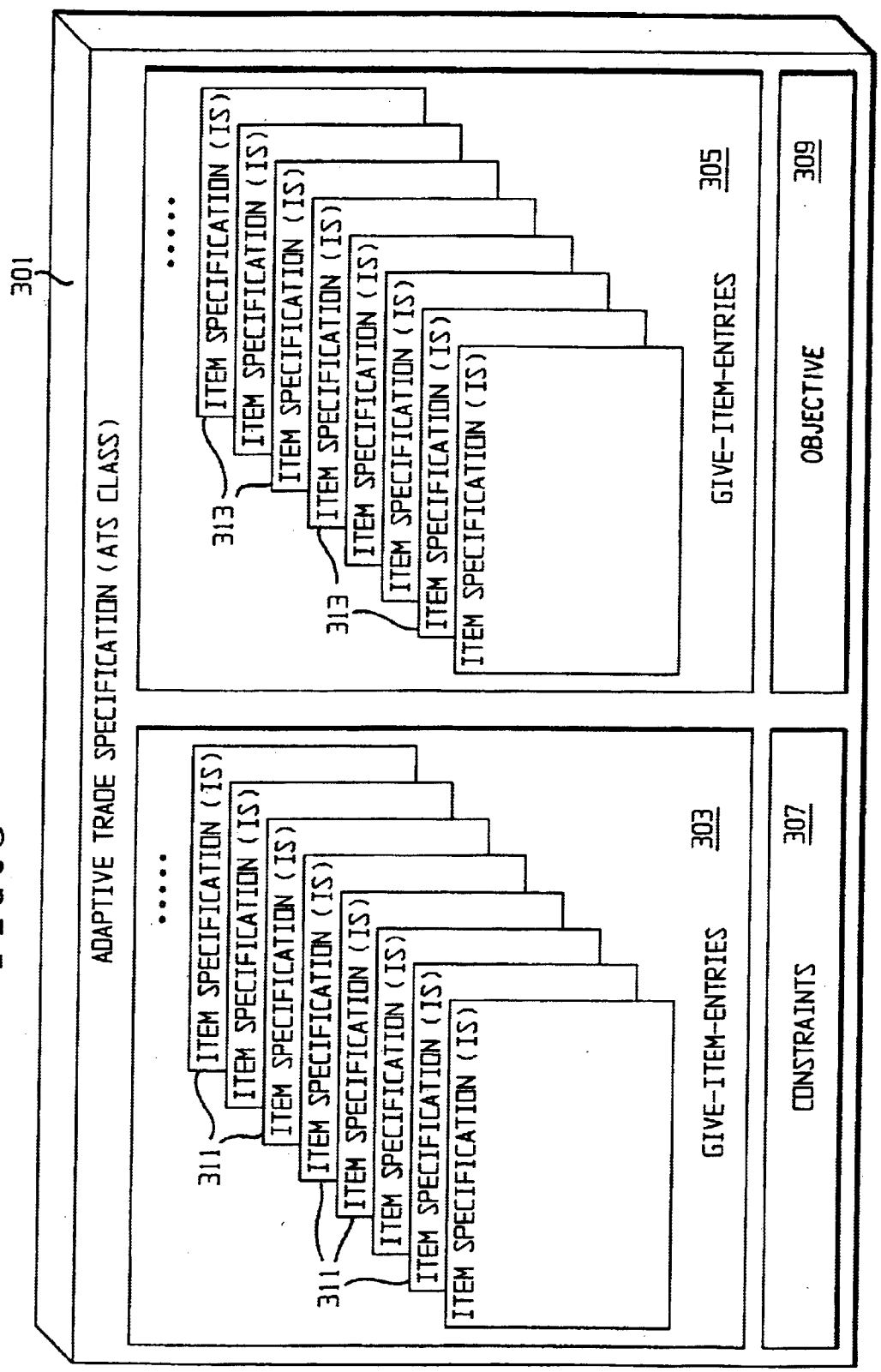
FIG. 3 Item Specification and Adaptive Trade Specification (ATS) Class Diagram, presents a high level graphical summary of the Item Specification and Adaptive Trade Specification classes.

FIG. 3 provides a high level graphical description of the classes Item Specification and Adaptive Trade Specification. An ATS class 301 includes four components: give-item-entries 303, take-item-entries 305, constraints 307 and an objective 309. The give-item-entries 303 identify what the particular user is willing to give in the trade and include one or more item specifications 311. The take-item-entries 305 identify what the user wants in return and include one or more item specifications 313. The constraints 307 set forth restrictions that must be satisfied before a transaction can be carried out, e.g., constraints on quantity or on time of delivery. The objective 309 indicates what the particular user wants to optimize; for example, a seller may want to optimize (maximize) profit, while a buyer may want to optimize (minimize) total cost.

ATS-based match-making (MM) optimization methods will now be explained.

Given a trader's ATS, the MM Optimization methods recommend specific transactions with other traders (i.e., against their ATS's) that are mutually agreeable and optimize the objective of the trader's ATS (e.g., minimal price, maximal profit etc.). The recommended set of transactions will indicate exactly with whom the transaction should be made, the exact GIVE and TAKE items and their quantities, as well as other relevant parameters (e.g., price and profit). For example, for procurement ATS, the MM optimization methods can recommend a set of suppliers ATS's and the exact quantities of the items to be purchased from each, so that the procurement ATS objective, say the minimal total cost, is achieved. Or, for a manufacturer's ATS, the MM optimization methods can recommend a set of buyers ATS's interested in the manufacturer's products, and a set of ATS's suppliers of raw materials necessary to manufacture the products, so that the manufacturer's objective, say maximal profit, is achieved. The ATS-based match making and optimization are generic and work uniformly regardless of how or for what type of trader the input ATS's were generated (e.g., what "wizard" interface generated them).

We will now describe three methods for match-making optimization and two auxiliary methods for mathematical programming optimization and the construction of multi-match constraints.

Given Mathematical Programming Optimization Methods

The MM optimization methods use, and assume as given, two mathematical programming methods (functions):
Minimize(Objective-Function, Constraint) and
Maximize(Objective-Function, Constraints)
These functions find the minimum and maximum, respectively, of the objective function subject to Constraints.

Specifically, each of the methods returns as output an object Value-At-Point of the class Value-At-Point-Class, which has two attributes:
1. Optimal-Value (i.e., maximum or minimum)
2. Optimal-Variable-Instantiation, that is, a Variable-Instantiation that satisfies the Constraints, and at which the Optimum-Value is achieved.

The mathematical programming methods above are provided as examples for carrying out the preferred embodiment and are not intended as limitations on the present invention. For many families of constraints, such as linear, mixed integer linear etc., commercial and freeware software packages are available that provide the functionality of the Minimize and Maximize methods. As an example, CPLEX of the ILOG corporation and OSL of the IBM corporation are well-known packages for mixed integer (mathematical) programming.

FIGS. 4A–4E provide a high level graphical description of the methods outlined below. FIGS. 5A–5E provide corresponding low-level descriptions.

Figure 5A:
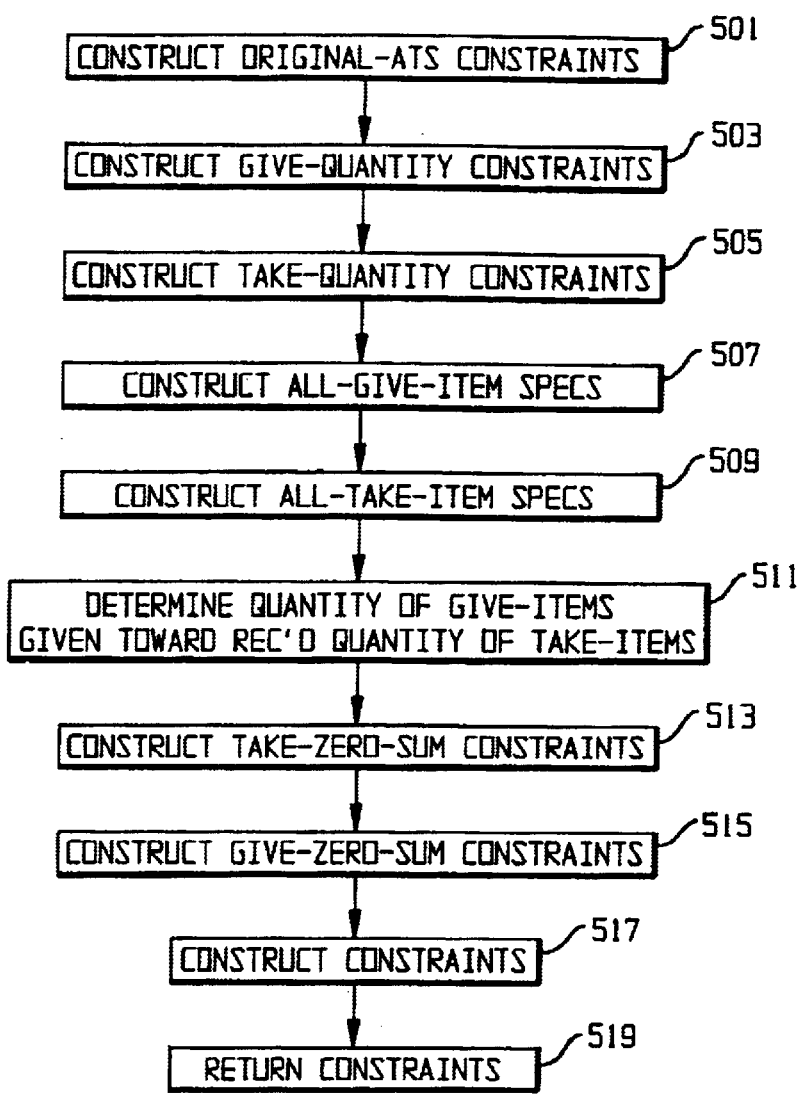
FIGS. 5A–5E Flow Charts of Specific Match-Making and Optimization Methods, present in greater detail the methods of FIGS. 4A–4E.
Figure 5C:
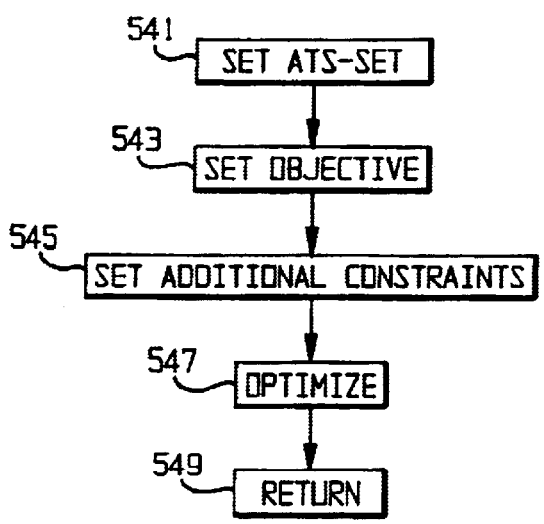
Figure 5B:
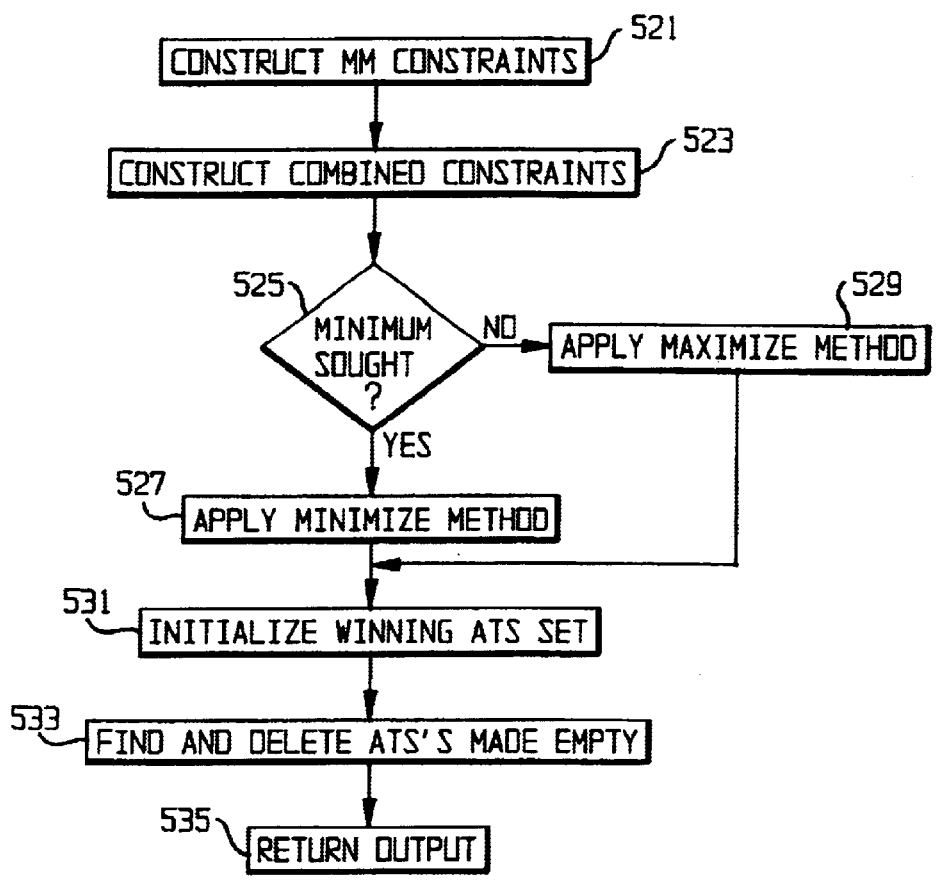
Figure 5E:
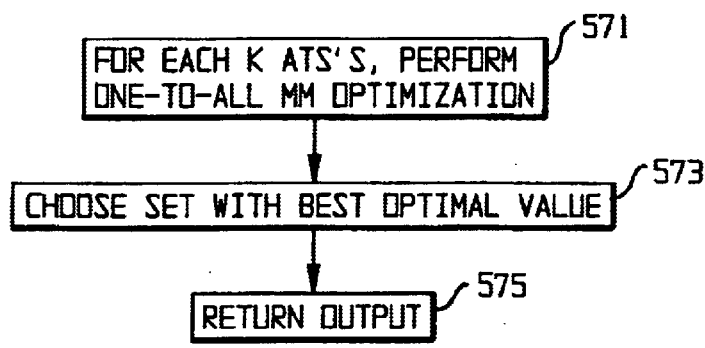
Figure 5D:
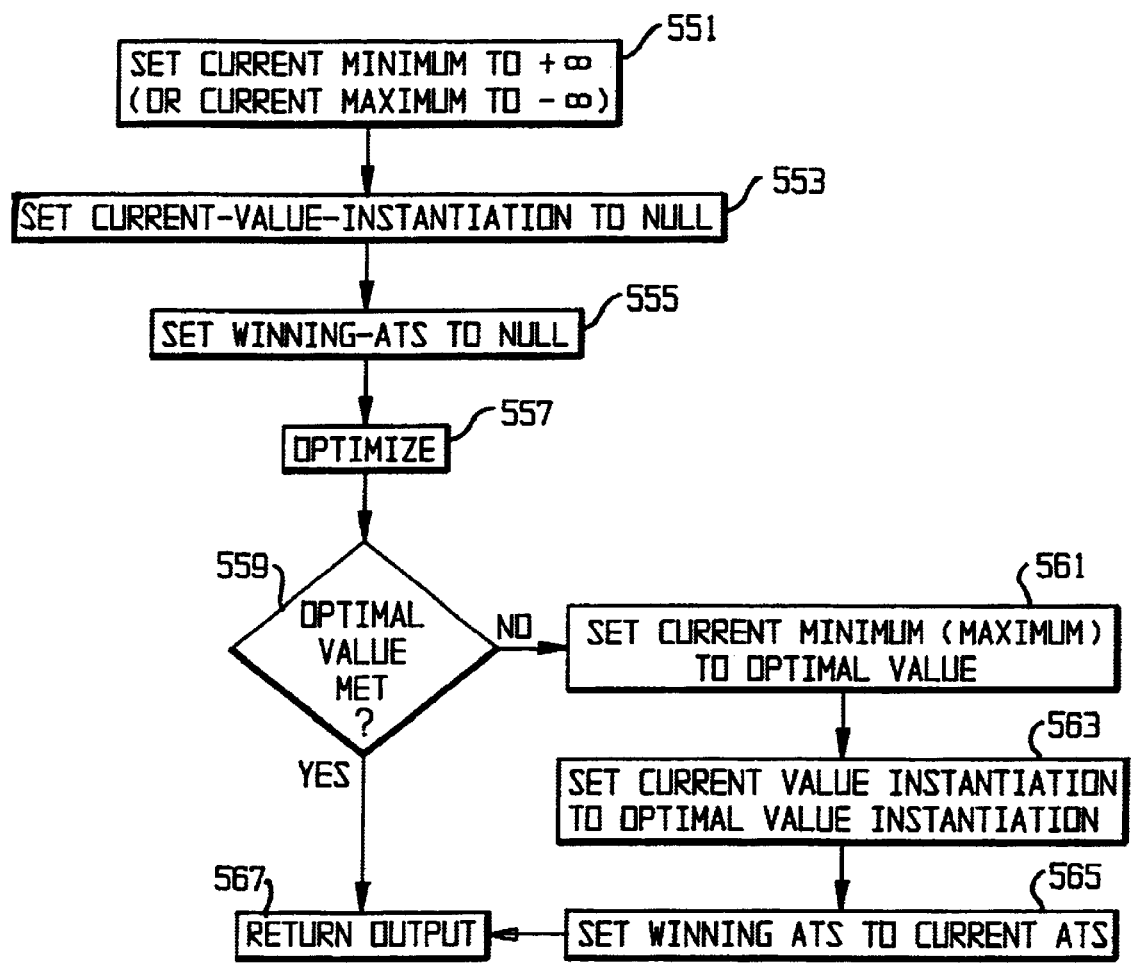

A. Method for Constructing ATS MM Constraints (FIGS. 4A and 5A)

Method (403) Name: Construct-ATS-MM-Constraints ({A1,A2, . . . ,An})

Input (401): A set {A1,A2, . . . ,An} of ATS's.

Output (405): Constraints that express the fact that ATS's in {A1,A2, . . . ,An} are mutually agreeable.

Algorithm Description:

Step 501. Construct Original-ATS-Constraints as

Constraints of A1 AND

Constraints of A2 AND

. . . AND

Constraints of An.

Step 503. Construct Give-Quantity-Constraints as follows:
a. Initially, set Give-Quantity-Constraints to the empty conjunction (logical AND) of constraints,
i.e. a constraint that is equivalent to TRUE.
b. For each ATS A from the set {A1, . . . ,An} and
For each item specification IS from Give-Item-Entries of A do:
  Set Give-Quantity-Constraints to
  Give-Quantity-Constraints AND quantity-range of IS
  (note, the latter is Lower-bound[IS]<=Quantity[IS]<=Upper-bound[IS])

Step 505. Construct Take-Quantity-Constraints as follows:
a. Initially, set Take-Quantity-Constraints to the empty conjunction (logical AND) of constraints,
i.e. a constraint that is equivalent to FALSE.
b. For each ATS A from the set {A1, . . . ,An} and
For each item specification IS from Take-Item-Entries of A do:
  Set Take-Quantity-Constraints to
  Take-Quantity-Constraints AND quantity-range of IS
  (Note: the latter is Lower-bound[IS]<=Quantity[IS]<=Upper-bound[IS])

Step 507. Construct the set All-Give-Item-Specs as follows:
a. Set All-Give-Item-Specs to the empty set
b. For each ATS A from the input set {A1, . . . ,An} of ATS's do:
  Set All-Give-Item-Specs to All-Give-Item-Specs union Item-Specs,
    where Item-Specs is the set of all item specifications in Give-Item-Entries of the ATS A.

Step 509. Construct the set All-Take-Item-Specs as follows:
a. Set All-Take-Item-Specs to the empty set.
b. For each ATS A from the input set $\{A1, \ldots, An\}$ of ATS's do:
Set All-Take-Item-Specs to All-Take-Item-Specs union Item-Specs,
where Item-Specs is the set of all item specifications in Take-Item-Entries of the ATS A.
Step 511. For each item specification tIS from All-Take-Item-Specs and For each item specification gIS from All-Give-Item-Specs such that Give-Take-Item-Match(gIS, tIS)=TRUE (i.e., gIS satisfies the requirements of tIS) do:
Create a new quantity variable Quantity[gIS, tIS].
(Note: Quantity[gIS, tIS] expresses the quantity of gIS given toward the required quantity of tIS)
Step 513. Construct Take-Zero-Sum-Constraints as follows:
For each item specification tIS from All-Take-Item-Specs do:
a. Set Zero-Sum-Constraints[tIS] to $$\text{Quantity}[tIS] = \text{Quantity}[gIS\text{-}1, tIS] + \ldots + \text{Quantity}[gIS\text{-}n, tIS]$$

where gIS-1, ..., gIS-n are all item specification from All-Give-Item-Specs that are satisfied by the item specification tIS (i.e., Give-Take-Item-Match(gIS-I, tIS]=TRUE for every I=1, ..., n)
b. Set Take-Zero-Sum-Constraints to
Zero-Sum-Constraints[tIS-1] AND ... AND Zero-Sum-Constraints[tIS-m] where tIS-1, ..., tIS-m are all item specifications from All-Take-Item-Specs.
Step 515. Construct Give-Zero-Sum-Constraints as follows:
For each item specification tIS from All-Give-Item-Specs do:
a. Set Zero-Sum-Constraints[gIS] to $$\text{Quantity}[gIS] = \text{Quantity}[gIS, tIS\text{-}1] + \ldots + \text{Quantity}[gIS, tIS\text{-}m]$$

where tIS-1, ..., tIS-m are all item specification from All-Take-Item-Specs that satisfy the item specification gIS (i.e., Give-Take-Item-Match(gIS, tIS-I]=TRUE for every I=1, ..., m)
b. Set Give-Zero-Sum-Constraints to
Zero-Sum-Constraints[gIS-1] AND ... AND Zero-Sum-Constraints[gIS-n] where gIS-1, ..., gIS-n are all item specifications from All-Give-Item-Specs.
Step 517. Construct Constraints as
Original-Constraints AND
Give-Quantity-Constraints AND
Take-Quantity-Constraints AND
Give-Zero-Sum-Constraints AND
Take-Zero-Sum-Constraints
Step 519. Return Constraints as output.
End of Method.
Generic Multiple MM Optimization Method (FIGS. 4B and 5B)
Method (407) Name: ATS-Multiple-MM-Optimization ($\{A, \ldots, An\}$, Objective, Additional-Constraints)
Input (409):
1. A set $\{A1, \ldots, An\}$ of ATS's (411)
2. Objective of the class Objective-Class (recall: it includes an Objective-Function and an indication whether minimum or maximum is sought. (413)
3. Additional-Constraints, which can be used to describe additional interrelationships among numeric variables in different ATS's in $\{A1, \ldots, An\}$. (415)

Output (417):
1. An Optimal-Variable-Instantiation into all variables that appear in MM-Constraints($\{A1, \ldots, An\}$) (including quantities of all item specifications) that achieves the optimal objective of the Optimizing-ATS. (419)
2. The Optimal-Value for the Objective-Function for the Optimal-Variable-Instantiation. (421)
3. A set Winning-ATS-set of winning filtered ATS's from Committed-ATS-Set in which all items specifications IS with Quantity[IS]=0 are eliminated. Also eliminated from Winning-ATS-Set are all ATS's in which both Give-Item-Entries and Take-Item-Entries became empty, after item specification with zero quantities were eliminated. (423)
Algorithm Description:
Step 521. Construct MM-Constraints by applying the method Construct-ATS-MM-Constraints($\{A1, \ldots, An\}$) on the input set of ATS's $\{A1, \ldots, An\}$.
Step 523. Construct Combined-Constraints as MM-Constraints AND Additional-Constraints
Steps 525–529. If Objective indicates that minimum is sought (step 525), apply the method Minimize(Objective-Function, Combined-Constraints) (step 527) that returns the optimal Value-At-Point (Recall: it has the attributes Optimal-Value of the type Real and Optimal-Point of the class Variable-Instantiation-Class). Otherwise, if Objective indicates that maximum is sought, apply the method Maximize(Objective-Function, Combined-Constraints) (step 529) that returns the optimal Value-At-Point. (Recall: it has the attributes Optimal-Value of the type Real and Optimal-Variable-Instantiation of the class Variable-Instantiation-Class).
Step 531. Initialize Winning-ATS-Set as $\{A1, \ldots, An\}$.
Step 533. For every ATS A in Winning-ATS-Set do:
a. For every item specification IS in Give-Item-Entries of A do:
If Quantity[IS] is instantiated to 0 by the variable instantiation Value-At-Point then
Delete IS from Give-Item-Entries and the related mapping to Quantity-Ranges
b. For every item specification IS in Take-Item-Entries of A do:
If Quantity[IS] is instantiated to 0 by the variable instantiation Value-At-Point then
Delete IS from Give-Item-Entries and the related mapping to Quantity-Ranges
c. If both Give-Item-Entries and Take-Item-Entries of A become empty after deletion of item specifications in steps a. and b., then delete A from Winning-ATS-Set.
Step 535. Return as output:
a. Optimal-Variable-Instantiation which is the Variable-Instantiation which was returned in Value-At-Point.
b. The Optimal-Value which was returned in Value-At-Point.
Winning-ATS-Set
End of method.
One-to-All MM Optimization Method (FIGS. 4C and 5C)
Method (425) Name: ATS-One-to-All-MM-Optimization ($\{$Optimizing-ATS, committed-ATS-Set$\}$)
Input (427):
1. Optimizing-ATS, which is an ATS whose Objective will be used for optimization. (429)
2. Committed-ATS-Set, which is a set of ATS's that are committed to perform a transaction if and only if their Constraints are satisfied. The Objectives of the committed ATS's are not used in optimization. (431)
Output (433):
1. An Optimal-Variable-Instantiation into all variables that appear in MM-Constraints($\{$Optimizing-ATS$\}$ union Committed-ATS-Set) (including quantities of all item specifications) that achieves the optimal objective of the Optimizing-ATS. (435)
2. The Optimal-Value for the Objective-Function for the Optimal-Variable-instantiation. (437)
3. A set Winning-ATS-set of winning filtered ATS's from Committed-ATS-Set in which all items specifications IS with Quantity[IS]=0 are eliminated. Also eliminated from Winning-ATS-Set are all ATS's in which both Give-item-Entries and Take-item-Entries became empty after item specifications with zero associated quantity were eliminated. (439)

Algorithm Description:
Step 541. Set ATS-Set to the union of Committed-ATS-Set and the singleton set {Optimizing-ATS}
Step 543. Set Objective to the objective of Optimizing-ATS
Step 545. Set Additional-Constraints to the empty conjunction of constraints, i.e., the constraint equivalent to TRUE.
Step 547. Apply the method ATS-Multiple-MM-Optimization(ATS-Set, Objective, Additional-Constraints) to compute Optimal-Variable-Instantiation, Optimal-Value and Winning-ATS-Set.
Step 549. Return Optimal-Variable-Instantiation, Optimal-Value and Winning-ATS-Set as output.
End of Method One-to-One MM Optimization Method (FIGS. 4D and 5D)
Method (441) Name: One-to-One-MM-Optimization ({Optimizing-ATS, Committed-ATS-Set})
Input (443):
1. Optimizing-ATS, which is an ATS whose Objective will be used for optimization. (445)
2. Committed-ATS-Set, which is a set of ATS's that are committed to perform a transaction if and only if their Constraints are satisfied. The Objectives of the committed ATS's are not used in optimization. (447)
Output (449):
1. Winning-ATS, from Committed-ATS-Set, which is recommended for making a deal with. All item specifications IS with Quantity[IS]=0 (in Optimal-Variable-Instantiation below) are deleted. (451)
2. An Optimal-Variable-Instantiation into all variables that appear in MM-Constraints({Optimizing-ATS, Winning-ATS}) (including quantities of all item specifications) that achieves the optimal objective of the Optimizing-ATS. (453)
3. The Optimal-Value of the Objective-Function for the Optimal-Variable-Instantiation. (455)
Algorithm Description:
A. If the Objective of the Optimizing-ATS requires minimum, do:
Step 551. Set Current-Minimum to +infinity
Step 553. Set Current-Variable-Instantiation to null (i.e., undefined).
Step 555. Set Winning-ATS to null (i.e., undefined).
For each ATS A in Committed-ATS-Set do:
Step 557. Apply ATS-Multiple-MM-Optimization on the set {Optimizing-ATS, A} of ATS's, the Objective of Optimizing-ATS, and the empty Additional-Constraints.
Steps 559–565. If the returned Optimal-Value <Current-Minimum, as determined in step 559, do:
Step 561. Set Current-Minimum to Optimal-Value;
Step 563. Set Current-Variable-Instantiation to the returned Optimal-Variable-Instantiation.
Step 565. Set Winning-ATS to the current ATS A.
Step 567. Return as output:
Winning-ATS
Current-Variable-Instantiation as Optimal-Variable-Instantiation
Current-minimum as Optimal-Value.
B. If the Objective of the Optimizing-ATS requires maximum, do:
Step 551. Set Current-Maximum to −infinity
Step 553. Set Current-Variable-Instantiation to null (i.e., undefined).
Step 555. Set Winning-ATS to null (i.e., undefined).
For each ATS A in Committed-ATS-Set do:
Step 557. Apply ATS-Multiple-MM-Optimization on the set {Optimizing-ATS, A} of ATS's, the Objective of Optimizing-ATS, and the empty Additional-Constraints.
Steps 559–565. If the returned Optimal-Value>Current-Minimum, as determined in step 559, do:
Step 561. Set Current-Maximum to Optimal-Value;
Step 563. Set Current-Variable-Instantiation to the returned Optimal-Variable-Instantiation.
Step 565. Set Winning-ATS to the current ATS A.
Step 567 Return as output:
Winning-ATS
Current-Variable-Instantiation as Optimal-Variable-Instantiation
Current-Maximum as Optimal-Value.
End of Method One-to-K MM Optimization Method (FIGS. 4E and 5E)
Method (457) Name: ATS-One-to-K-MM-Optimization ({Optimizing-ATS, Committed-ATS-Set})
Input (459):
1. Optimizing-ATS, which is an ATS whose Objective will be used for optimization. (461)
2. Committed-ATS-Set, which is a set of ATS's that are committed to perform a transaction if and only if their Constraints are satisfied. The Objectives of the committed ATS's are not used in optimization. (463)
Output (465):
1. An Optimal-Variable-Instantiation into all variables that appear in MM-Constraints({Optimizing-ATS} union Winning-ATS-Set) (including quantities of all item specifications) that achieves the optimal objective of the Optimizing-ATS. (467)
2. The Optimal-Value for the Objective-Function for the Optimal-Variable-Instantiation. (469)
3. Winning-ATS-set of at most K winning filtered ATS's from Committed-ATS-Set in which all items specifications IS with Quantity[IS]=0 are eliminated. Also eliminated from Winning-ATS-Set are all ATS's in which both Give-Item-Entries and Take-Item-Entries became empty after item specifications with zero associated quantity were eliminated. (471)
Algorithm Description:
Step 571. For each K ATS's {A1, . . . ,Ak} in Committed-ATS-Set, perform ATS-One-to-All-MM-optimization (Optimizing-ATS, {A1, . . . ,Ak}).
Step 573. Among all sets {A1, . . . ,Ak}, choose the one that has minimal (or maximal, as required in Optimizing-ATS) Optimal-Value.
Step 575. Return as output the output of ATS-One-to-All-MM-Optimization for the selected set {A1, . . . ,Ak} with the minimal (or maximal, as required in Optimizing-ATS) objective.

End of Method.

While a preferred embodiment of the present invention has been set forth in detail above, those skilled in the art who have reviewed the present disclosure will readily appreciate that other embodiments can be realized within the scope of the present invention. For example, disclosures of certain hardware, operating systems, and other software are illustrative rather than limiting, as are specific numerical values. Therefore, the present invention should be construed as limited only by the appended claims.

We claim:

1. A method for constructing a match-making constraint that expresses a fact that a match among a plurality of traders is acceptable to all of the traders, the method comprising:

(a) defining, in a computing device, an adaptive trade specification for each of the traders, the adaptive trade specification comprising (i) item specifications of items that the trader is willing to trade, the item specifications comprising at least one give-item specification of an item that the trader is willing to give in a trade and at least one take-item specification of an item that the trader is willing to take in the trade, (ii) at least one constraint representing a restriction on the trade and (iii) an objective representing a function that the trader wishes to optimize in the trade;

(b) constructing, in the computing device, an original constraint by performing a logical AND function on the constraints of all of the adaptive trade specifications;

(c) constructing, in the computing device, a give-quantity constraint in accordance with the give-item specifications of all of the adaptive trade specifications, the give-quantity constraint representing quantities of all of the items specified in the give-item specifications;

(d) constructing, in the computing device, a take-quantity constraint in accordance with the take-item specifications of all of the adaptive trade specifications, the take-quantity constraint representing quantities of all of the items specified in the take-item specifications;

(e) constructing, in the computing device, all-give-item specifications identifying all of the items specified in the give-item specifications of all of the adaptive trade specifications;

(f) constructing, in the computing device, all-take-item specifications identifying all of the items specified in the take-item specifications of all of the adaptive trade specifications;

(g) for each of the items identified in the all-give-item specification and for each of the items identified in the all-take-item specification, creating, in the computing device, a quantity variable of the item identified in the all-give-item specifications given toward the quantity of the item identified in the all-take-item specifications;

(h) constructing, in the computing device, a take-zero-sum constraint in accordance with the quantity variables determined in step (g), the take-zero-sum constraint identifying whether all of the items in the all-take-item specifications are available in the all-give-item specifications;

(i) constructing, in the computing device, a give-zero-sum constraint in accordance with the quantity variables determined in step (g), the give-zero-sum constraint identifying whether all of the items in the all-give-item specifications are required in the all-take-item specifications; and (j) constructing the match-making constraint in the computing device by performing a logical AND operation on the original constraint, the give-quantity constraint, the take-quantity constraint, the take-zero-sum constraint and the give-zero-sum constraint, then outputting said match-making constrains to a user.

2. A method for forming a match among a plurality of traders and for recommending an optimal trade, the method comprising:

(a) defining, in a computing device, an adaptive trade specification for each of the traders, the adaptive trade specification comprising (i) item specifications of items that the trader is willing to trade, the item specifications comprising at least one give-item specification of an item that the trader is willing to give in a trade and at least one take-item specification of an item that the trader is willing to take in the trade, the at least one give-item specification comprising a give-item quantity and the at least one take-item specification comprising a take-item quantity, (ii) at least one constraint representing a restriction on the trade and (iii) an objective representing a function that the trader wishes to optimize in the trade;

(b) constructing, in the computing device, a match-making constraint that expresses a fact that a match among the plurality of traders satisfies the adaptive trade specifications of all of the plurality of traders;

(c) performing, in the computing device, an optimization on a set of the traders to optimizes the objective of one of the traders in the set subject to the match-making constraint;

(d) determining, in the computing device, a winning set by deleting, from the set of the traders, all of the traders whose give-item quantities and take-item quantities have been set to zero in the optimization; and (e) returning the winning set as a recommendation of an optimal trade then outputting said recommendation to a user.

3. The method of claim 2, wherein step (c) comprises:

(i) for each of the traders, eliminating every give-item whose give-item quantity has been set to zero and every take-item whose take-item quantity has been set to zero; and (ii) eliminating each of the traders for which every give-item and every take-item have been eliminated.

4. The method of claim 2, wherein:

the optimization of step (c) is performed to optimize the objective of a specific one of the traders; and the objective optimized in step (c) is the objective set forth in the adaptive trade specification of the specific one of the traders.

5. The method of claim 4, wherein, in step (c) the set of the traders is a set comprising the specific one of the traders and all other traders who are committed to performing a transaction that satisfies their adaptive trade specification.

6. The method of claim 4, wherein:

the set of the traders in step (c) consists of the specific one of the traders and one other trader;

step (c) is performed for, each of the other traders; and step (e) comprises providing an identification of the one other trader for which the objective of the specific one of the traders reaches the best value.

7. The method of claim 4, wherein:

the specific one of the traders desires to trade with at most K other traders, K being a positive integer;

the set of the traders in step (c) consists of the specific one of the traders and K other traders, selected out of those traders who are committed to performing a transaction that satisfies their adaptive trade specification;

step (c) is performed for every set of K traders, so that the winning set will comprise at most K other traders; and step (e) comprises providing an identification of a specific set of K other traders for which the objective of the specific one of the traders reaches the best value.

8. The method of claim 2, wherein step (b) comprises constructing, in the computing device, the match-making constraint by:

(I) constructing, in the computing device, an original constraint by performing a logical AND function on the constraints of all of the adaptive trade specifications;

(II) constructing, in the computing device, a give-quantity constraint in accordance with the give-item specifications of all of the adaptive trade specifications, the give-quantity constraint representing quantities of all of the items specified in the give-item specifications;

(III) constructing, in the computing device, a take-quantity constraint in accordance with the take-item specifications of all of the adaptive trade specifications, the take-quantity constraint representing quantities of all of the items specified in the take-item specifications;

(IV) constructing, in the computing device, all-give-item specifications identifying all of the items specified in the give-item specifications of all of the adaptive trade specifications;

(V) constructing, in the computing device, all-take-item specifications identifying all of the items specified in the take-item specifications of all of the adaptive trade specifications;

(VI) for each of the items identified in the all-give-item specification and for each of the items identified in the all-take-item specification, creating, in the computing device, a quantity variable of the item identified in the all-give-item specifications given toward the quantity of the item identified in the all-take-item specifications;

(VII) constructing, in the computing device, a take-zero-sum constraint in accordance with the quantity variables determined in step (VI), the take-zero-sum constraint identifying whether all of the items in the all-take-item specifications are available in the all-give-item specifications;

(VIII) constructing, in the computing device, a give-zero-sum constraint in accordance with the quantity variables determined in step (VI), the give-zero-sum constraint identifying whether all of the items in the all-give-item specifications are required in the all-take-item specifications; and (IX) constructing the match-making constraint in the computing device by performing a logical AND operation on the original constraint, the give-quantity constraint, the take-quantity constraint, the take-zero-sum constraint and the give-zero-sum constraint.

* * * * *